US012693170B2

(12) United States Patent      (10) Patent No.:   US 12,693,170 B2

Takahashi et al.      (45) Date of Patent:     Jul. 28, 2026

(54) TEMPERATURE SENSOR AND ROTARY ELECTRIC MACHINE

(71) Applicant: SHIBAURA ELECTRONICS CO., LTD., Saitama (JP)

(72) Inventors: Atsushi Takahashi, Saitama (JP); Maho Suzuki, Saitama (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 334 days.

(21) Appl. No.: 18/570,808

(22) PCT Filed: Sep. 20, 2022

(86) PCT No.: PCT/JP2022/034974

§ 371 (c)(1),
(2) Date: Dec. 15, 2023

(87) PCT Pub. No.: WO2024/062521

PCT Pub. Date: Mar. 28, 2024

(65) Prior Publication Data

US 2025/0123153 A1     Apr. 17, 2025

(51) Int. Cl.
    G01K 7/22        (2006.01)
    G01K 1/14        (2021.01)

(52) U.S. Cl.
    CPC ................. G01K 7/22 (2013.01); G01K 1/14 (2013.01)

(58) Field of Classification Search
None
See application file for complete search history.

(56) References Cited

U.S. PATENT DOCUMENTS

| | | | |
|---|---|---|---|
| 2015/0155760 A1* | 6/2015 | Bessho | H02K 11/25 |
| | | | 310/68 C |
| 2017/0370781 A1* | 12/2017 | Yoshihara | G01K 7/22 |
| 2018/0017446 A1 | 1/2018 | Yoshihara et al. | |
| 2020/0333192 A1 | 10/2020 | Takase et al. | |

(Continued)

FOREIGN PATENT DOCUMENTS

| | | |
|---|---|---|
| CN | 107209062 A | 9/2017 |
| CN | 111133286 A | 5/2020 |
| CN | 111316079 A | 6/2020 |

(Continued)

OTHER PUBLICATIONS

International Search Report dated Dec. 13, 2022 issued in PCT/JP2022/034974.
Written Opinion dated Dec. 13, 2022 issued in PCT/JP2022/034974.

*Primary Examiner* — Erica S Lin

(74) *Attorney, Agent, or Firm* — McDonald Hopkins LLC

(57) ABSTRACT

Provided is a temperature sensor in which a heat-sensitive body is likely to stay at a fixed position without positional displacement when resin molding the heat-sensitive body. A temperature sensor includes: a sensor element including a heat-sensitive body, a pair of lead wires electrically connected with the heat-sensitive body, and a pair of lead terminals electrically connected with the pair of lead wires; and a holder holding the sensor element. The holder includes a heat-sensitive surface receiving heat from a measurement object, a reference surface provided on a back side of the heat-sensitive surface, and a pressing body provided on the reference surface and pressing the heat-sensitive body against the reference surface.

10 Claims, 7 Drawing Sheets

(56) References Cited

U.S. PATENT DOCUMENTS

2020/0393306 A1    12/2020   Yoshihara et al.

FOREIGN PATENT DOCUMENTS

| | | | |
|---|---|---|---|
| CN | 114235182 | A | 3/2022 |
| JP | S56-137041 | U | 10/1981 |
| JP | H06-058334 | U1 | 8/1994 |
| JP | H08-219894 | A | 8/1996 |
| JP | 2003-092858 | A | 3/2003 |
| JP | 2018-105643 | A | 7/2018 |
| JP | 2018-179875 | A | 11/2018 |
| JP | 2019-012083 | A | 1/2019 |

* cited by examiner

C-C

TEMPERATURE SENSOR AND ROTARY ELECTRIC MACHINE

TECHNICAL FIELD

The present invention relates to a temperature sensor.

BACKGROUND ART

A temperature sensor is known that detects the temperature of a coil for controlling the electrical current to the coil in, for example, an electric motor. For example, Patent Literature 1 discloses an attachment structure for a temperature detection element that detects the temperature of the winding in the electric motor. The attachment structure includes a guide that is provided in a clearance between a stator core and a coil end in the electric motor and that accommodates the temperature detection element. The guide includes an elastically deformable catch portion, and the temperature detection element is inserted into the guide while the catch portion is deformed, so that a temperature-sensitive portion of the temperature detection element can be held in contact with an internal surface of the winding at a coil end portion. For the temperature detection element in Patent Literature 1, a thermistor molded with resin is used.

CITATION LIST

Patent Literature

Patent Literature 1: JP 2003-92858 A

SUMMARY OF INVENTION

Technical Problem

When a heat-sensitive body such as a thermistor is molded with resin, the positional displacement of the heat-sensitive body can occur. The positional displacement of the heat-sensitive body can also occur due to, for example, vibrations in the process of temperature detection. Hence, the present invention has an object to provide a temperature sensor that allows a heat-sensitive body to stay at a fixed position without the positional displacement even when resin molding or the like is performed.

Solution to Problem

A temperature sensor according to the present invention includes: a sensor element including a heat-sensitive body, a pair of lead wires that is electrically connected with the heat-sensitive body, a sealing layer that covers the heat-sensitive body and a part of the pair of lead wires, and a pair of lead terminals that is electrically connected with the pair of lead wires; and a holder that holds the sensor element.

The holder includes a heat-sensitive surface configured to receive heat from a measurement object, a reference surface provided on a back side of the heat-sensitive surface, and a pressing body that is provided on the reference surface and that presses the heat-sensitive body against the reference surface through the sealing layer.

The holder in the present invention includes a forward side on which the heat-sensitive body is arranged and a rearward side on which the pair of lead wires is drawn out.

The pressing body in the present invention includes a pair of pressing pieces in a width direction in which the heat-sensitive body is sandwiched, each of the pair of pressing pieces includes a flange that presses the heat-sensitive body against the reference surface, and a dimension of the flange from the reference surface is decreased from the rearward side of the heat-sensitive body toward the forward side.

Preferably, in the heat-sensitive body in the present invention, a gap between the pair of pressing pieces is narrowed from the rearward side toward the forward side of the heat-sensitive body.

Preferably, in the holder in the present invention, a pair of positioning pieces provided on the rearward side relative to the pair of pressing pieces, with a predetermined gap therebetween is included.

Preferably, the holder in the present invention includes an accommodating space that is provided so as to face the reference surface and that accommodates the sensor element. The sensor element is sealed by a resin mold with which the accommodating space is filled.

Preferably, the holder in the present invention includes a facing surface that opposes a support body on which the holder is placed when a temperature of the measurement object is detected. Preferably, the facing surface includes a first facing surface of the resin mold and a second facing surface of an accommodating frame that encloses a circumference of the resin mold, and the first facing surface is dented to a side of the heat-sensitive surface relative to the second facing surface.

Preferably, the holder in the present invention includes a partition that serves for positioning of the pair of lead terminals in an interior of the accommodating space. The partition includes a base that stands from the reference surface and that extends in a length direction orthogonal to a width direction in which the heat-sensitive body is sandwiched, and a terminal pressing member that projects from a top portion of the base in the width direction.

The present invention provides also a rotary electric machine including one temperature sensor described above.

Advantageous Effect of Invention

According to the temperature sensor of the present invention, since the pressing body is included, a temperature sensor in which a sensor element is likely to stay at a fixed position without the positional displacement even when resin molding or the like is performed is provided.

DESCRIPTION OF EMBODIMENTS

A temperature sensor 1 according to an embodiment will be described below with reference to the accompanying drawings.

Figure 1:
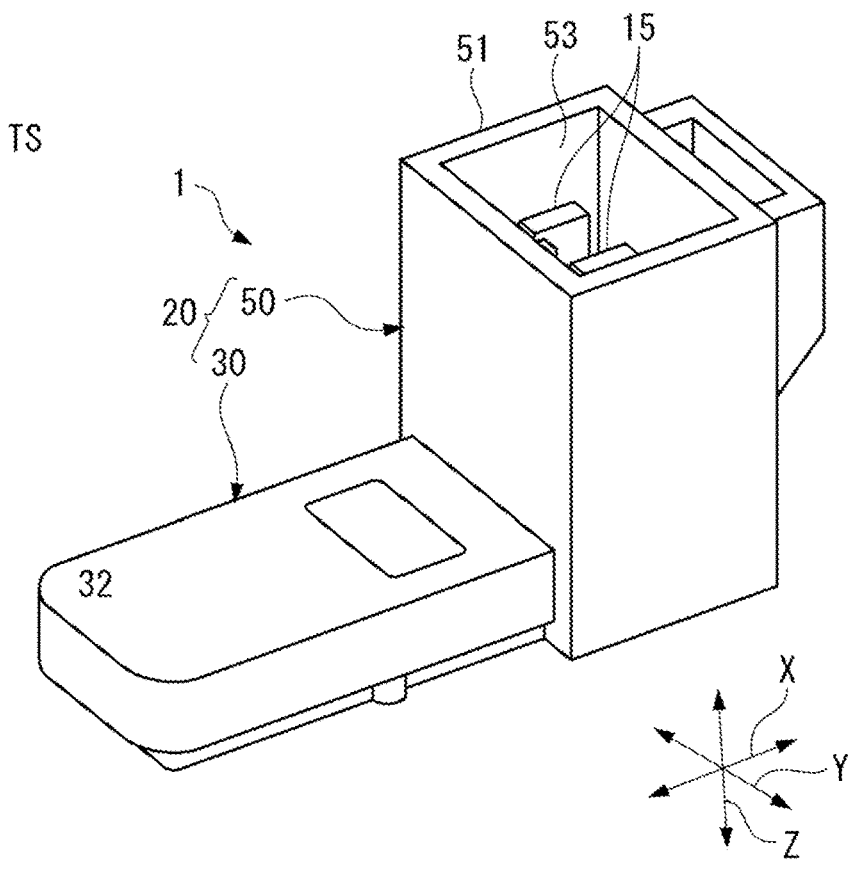
FIG. 1 shows a temperature sensor according to an embodiment, and shows a perspective view (TS) as viewed from above and a perspective view (BS) as viewed from below.
Figure 1:
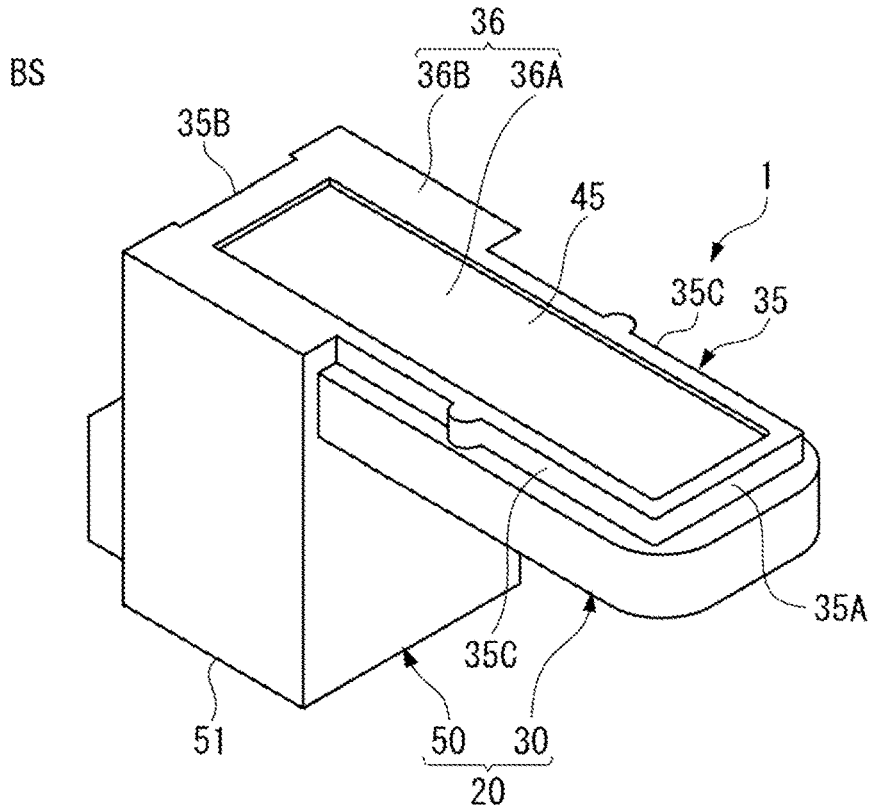
Figure 2:
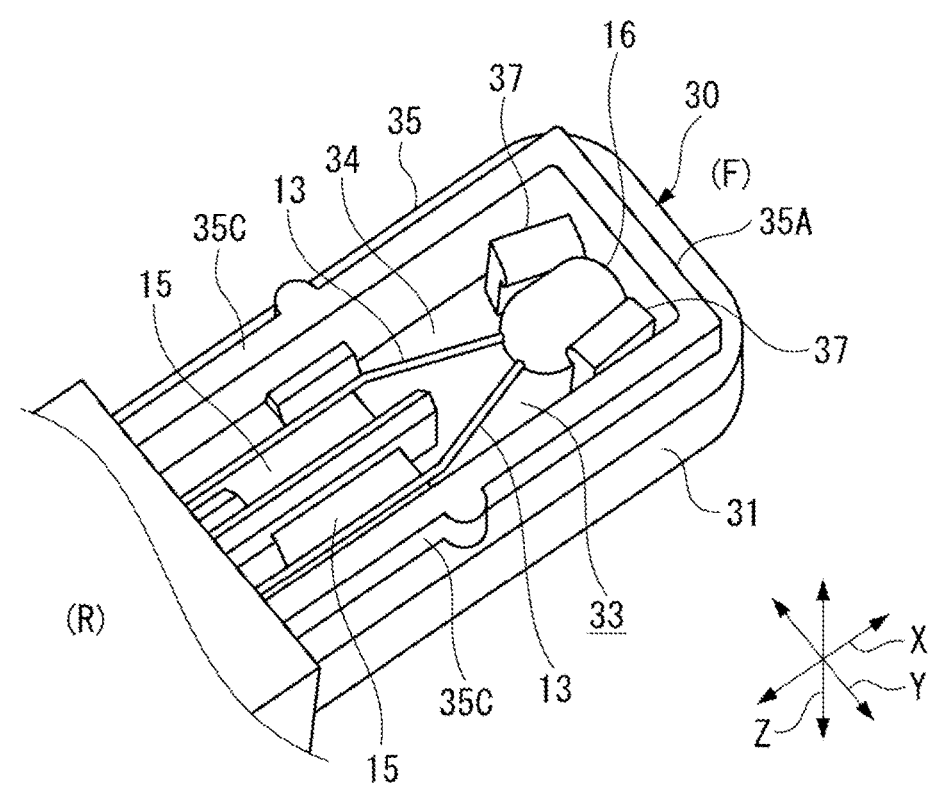
FIG. 2 is a diagram showing the arrangement of a sensor element in a holder of the temperature sensor in FIG. 1.
Figure 2:
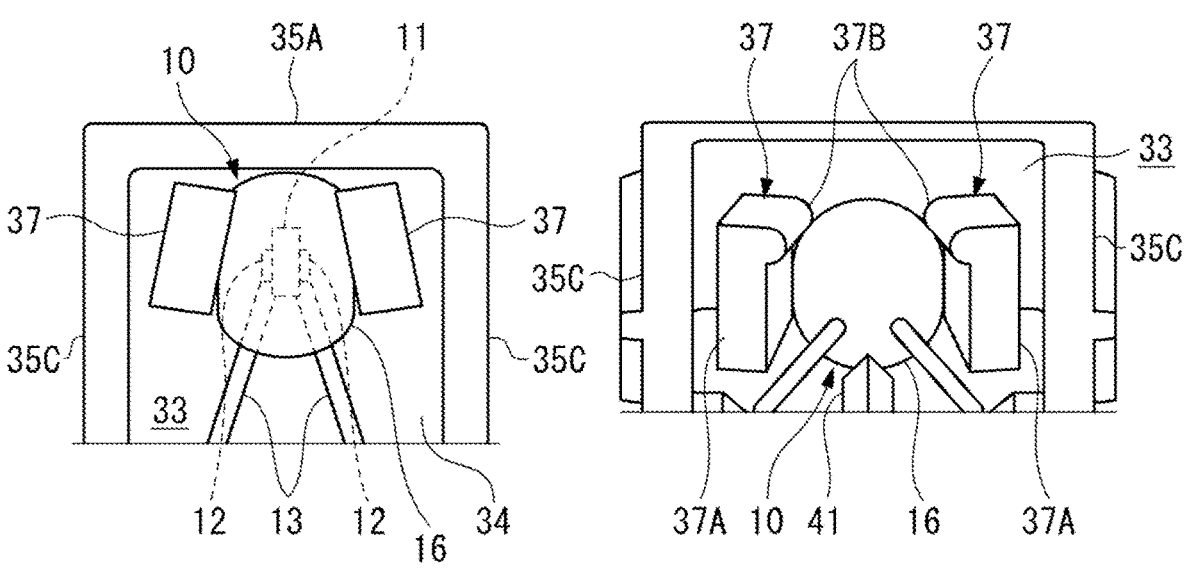

As shown in FIG. 1 and FIG. 2, the temperature sensor 1 includes a sensor element 10 and a holder 20 that holds the sensor element 10. The temperature sensor 1 includes a configuration for causing the sensor element 10 to stay at a necessary position in the holder 20. Further, the temperature sensor 1 includes a configuration that makes it possible to restrain the heat received from a measurement object 100 from escaping from the holder 20. Because of including these configurations, the temperature sensor 1 can measure the temperature of the measurement object 100 (see FIG. 7) accurately and quickly. In the temperature sensor 1, a length direction X, a width direction Y, and a height direction Z are defined, as shown in FIG. 1 and the like.

[Sensor Element 10: See FIG. 2]

The sensor element 10 includes a heat-sensitive body 11 that is formed in a rectangular parallelepiped shape and that detects the temperature of the measurement object 100, electrodes 12, 12 that are formed on two facing surfaces of the heat-sensitive body 11 respectively, a pair of lead wires 13, 13 that are electrically connected with the heat-sensitive body 11 through the electrodes 12, 12, and lead terminals 15, 15 that are electrically connected with the lead wires 13, 13 respectively. Further, the sensor element 10 includes a sealing layer 16 that covers the heat-sensitive body 11. The sensor element 10 is accommodated in an accommodating space 33 of the holder 20 and is secured in the holder 20 by a resin mold 45 that seals the accommodating space 33.

For the heat-sensitive body 11, a metal oxide or metal having a characteristic in which electrical resistance value changes due to temperature change is used. A constant electrical current is applied to the heat-sensitive body 11 via the pair of lead wires 13, 13, the voltage between the electrodes 12, 12 on the heat-sensitive body 11 is measured with a measuring instrument, and the resistance value from Ohm's law ($E=IR$) is evaluated to detect the temperature.

As the metal oxide, a thermistor (thermally sensitive resistor) is suitably used, and typically, an NTC thermistor (negative temperature coefficient thermistor) having a negative temperature coefficient is used. As the metal, platinum (for example, Pt100; JIS-C1604) is suitably used.

The electrodes 12 electrically connect the heat-sensitive body 11 and the lead wires 13, 13, and is preferably composed of a noble metal such as gold and platinum.

The lead wires 13, 13 are conductive wires for causing a constant electrical current to flow through the heat-sensitive body 11, and a metal material having a high electrical conductivity, typically, copper is used. For the lead wire 13, a Dumet wire is suitably used. The Dumet wire is a composite wire in which an inner layer composed of an iron-nickel alloy and an outer layer composed of copper are cladded.

The lead terminals 15, 15 cause electric current to flow through the lead wires 13, 13 that are electrical wires directly connected with the heat-sensitive body 11, and are electrically connected with the exterior. The lead terminals 15, 15 extend to the interior of a receiving cavity 53 of a connection portion 50 described later.

The sealing layer 16 is provided for restraining the occurrence of chemical change and physical change in the heat-sensitive body 11 by enclosing and sealing the heat-sensitive body 11 in an airtight state. As the sealing layer 16, it is preferable that glass is used, but depending on the environment in which the temperature sensor 1 is used, a resin material can be used, and the sealing layer 16 can be eliminated.

Particularly, in the case where Dumet wires are used for the lead wires 13, 13, it is possible to prevent breakage due to the thermal expansion of the lead wires 13, 13 by using the glass for the sealing layer 16, because the linear expansion coefficient of the iron-nickel alloy is close to that of glass. The sealing layer 16 is not limited to glass, and another member such as resin may be employed if the above condition is satisfied.

Figure 7:
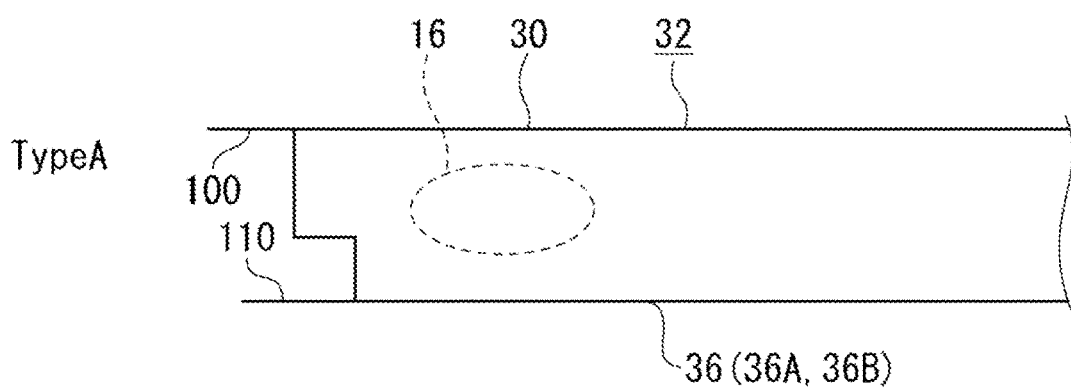
FIG. 7 is a partial side view showing the three forms for the facing surface of the heat-sensitive portion of the temperature sensor in FIG. 1.
Figure 7:
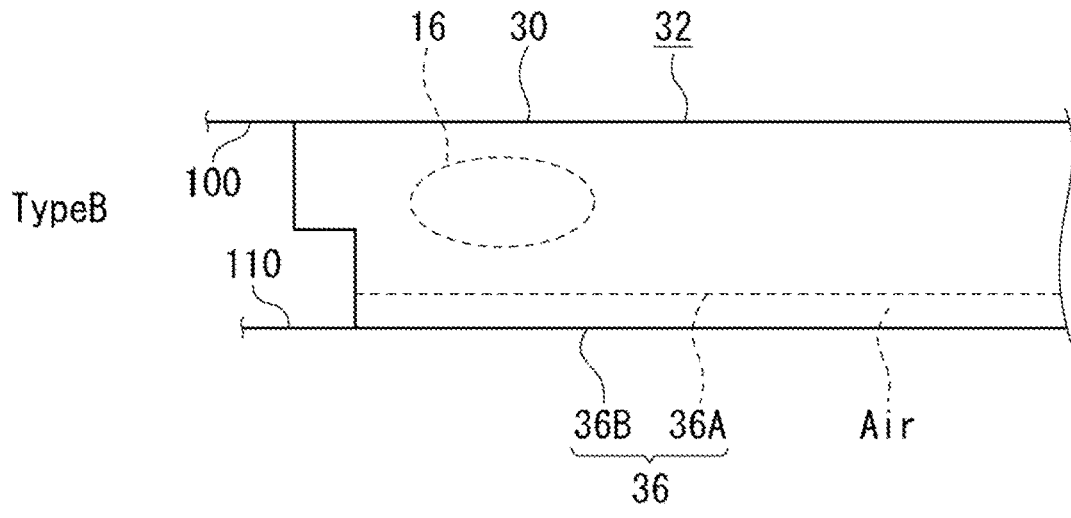
Figure 7:
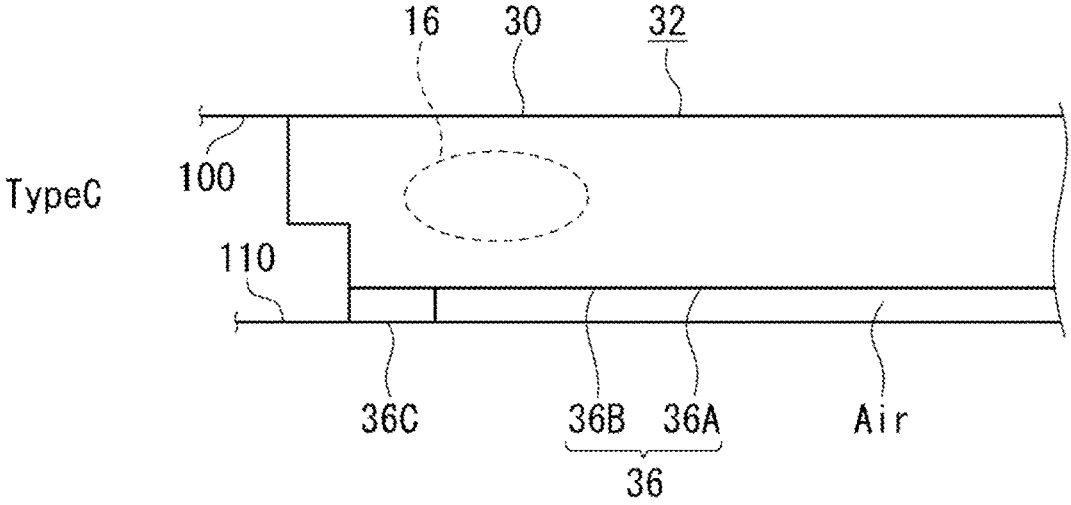

[Holder 20: see FIG. 1, FIG. 2, and FIG. 7]

The holder 20 that is pressed against the measurement object 100 and is placed on the support body 110 when the temperature of the measurement object 100 is measured will be described.

The holder 20 includes a heat-sensitive portion 30 and a connection portion 50. The heat-sensitive portion 30 accommodates a main portion of the sensor element 10 including the heat-sensitive body 11 and is pressed against the measurement object 100 such that the heat of the measurement object 100 is transferred to the heat-sensitive portion 30. The connection portion 50 crosses the heat-sensitive portion 30 and serves for the connection with the exterior. In the holder 20, as an example, the heat-sensitive portion 30 and the connection portion 50 are integrally molded by injection molding of a resin material. In the holder 20, the heat-sensitive portion 30 and the connection portion 50 form an L-shape in lateral view. The temperature sensor 1 contact with, for example, a stator coil of an electric motor that is the measurement object 100, on the heat-sensitive surface 32 of the heat-sensitive portion 30.

[Heat-Sensitive Portion 30: see FIG. 1, FIG. 2, FIG. 3, and FIG. 4]

As shown in FIG. 2, the heat-sensitive portion 30 includes a heat-sensitive surface 32, a heat-sensitive wall 31, and the accommodating space 33. The heat-sensitive surface 32 has a rectangular parallelepiped shape and is caused to be in contact with the measurement object 100. The heat-sensitive wall 31 is formed at a circumference portion of the heat-sensitive surface 32. The accommodating space 33 is provided so as to face the heat-sensitive surface 32 and the sensor element 10 is accommodates in the accommodating space 33. The accommodating space 33 of the heat-sensitive portion 30 is formed in a concave shape in which the circumference is enclosed by an accommodating frame 35, and a bottom portion thereof is a reference surface 34 that is a surface on the back side of the heat-sensitive surface 32. The accommodating frame 35 is constituted by a forward wall 35A that is provided on the forward (F) side, a rearward wall 35B that is provided on the rearward (R) side, and a pair of lateral walls 35C that is provided on both sides in the width direction Y.

Figure 3:
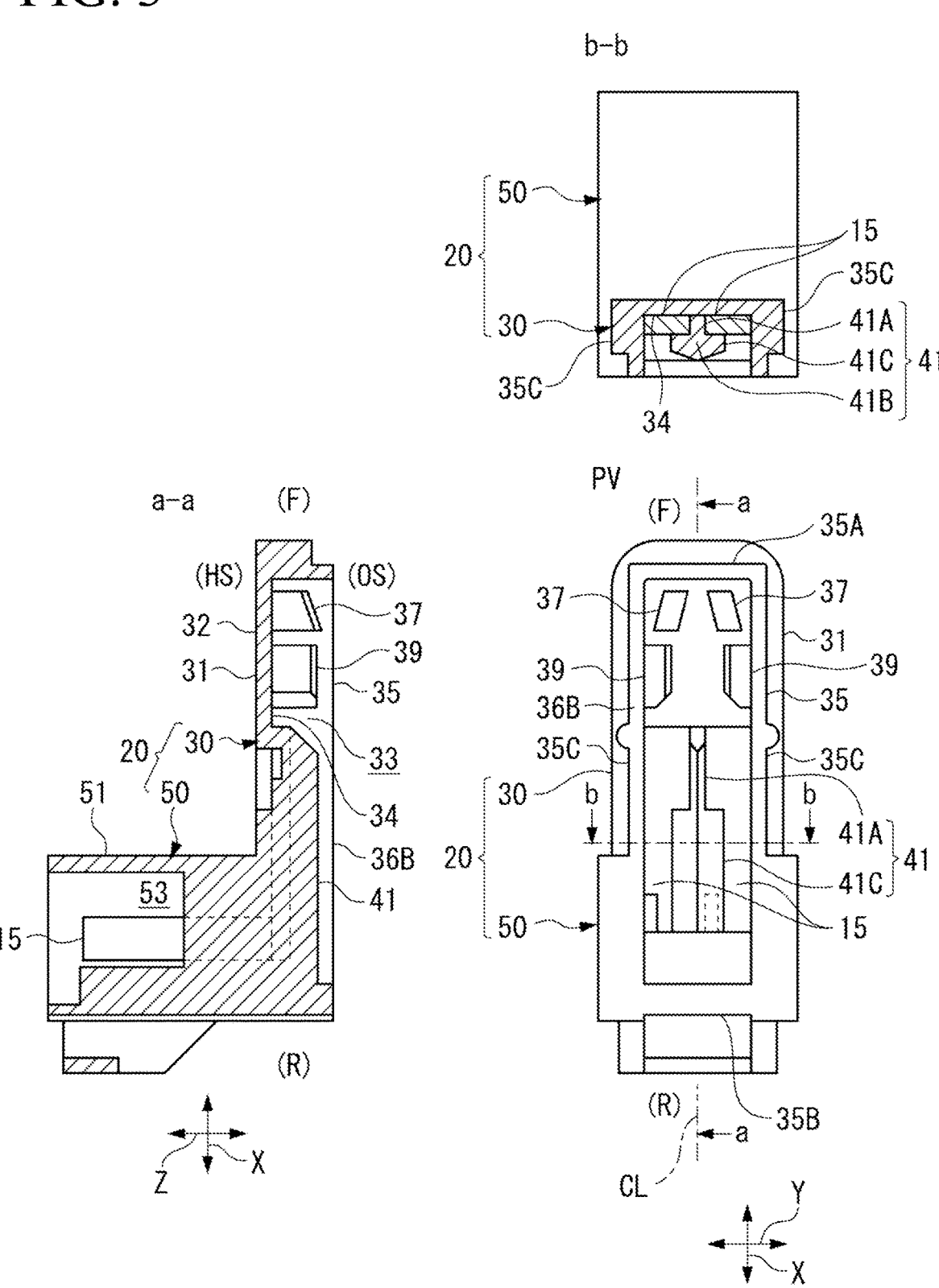
FIG. 3 is a drawing showing the holder of the temperature sensor in FIG. 1, and is a plan view (PV), an a-a arrow-view sectional view of the plan view, and a b-b arrow-view sectional view of the plan view.
Figure 4:
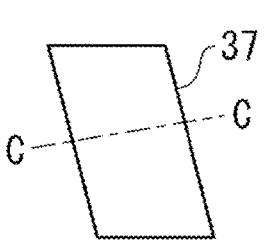
FIG. 4 is another drawing showing the holder of the temperature sensor in FIG. 1, and is a side view (SV), a bottom view (BV), an enlarged plan view of a pressing body, and a C-C line sectional view of the enlarged plan view.
Figure 4:
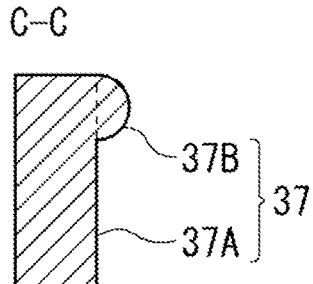
Figure 4:
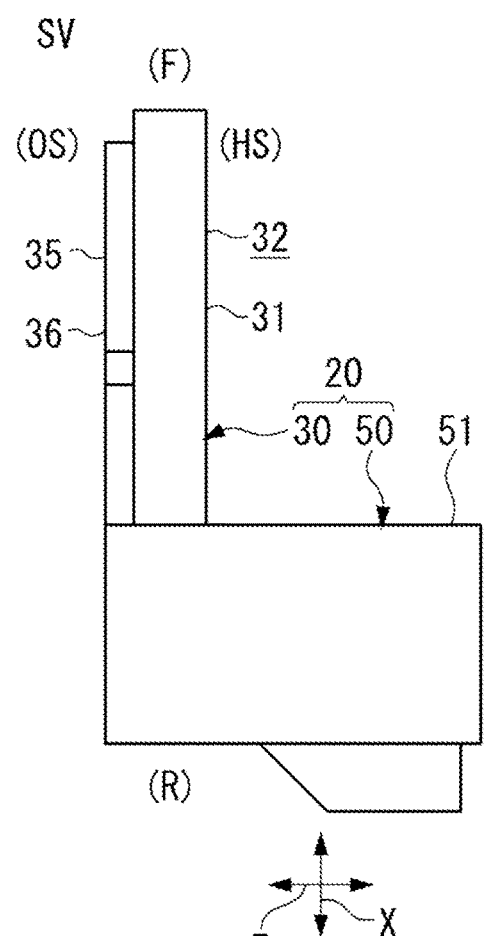
Figure 4:
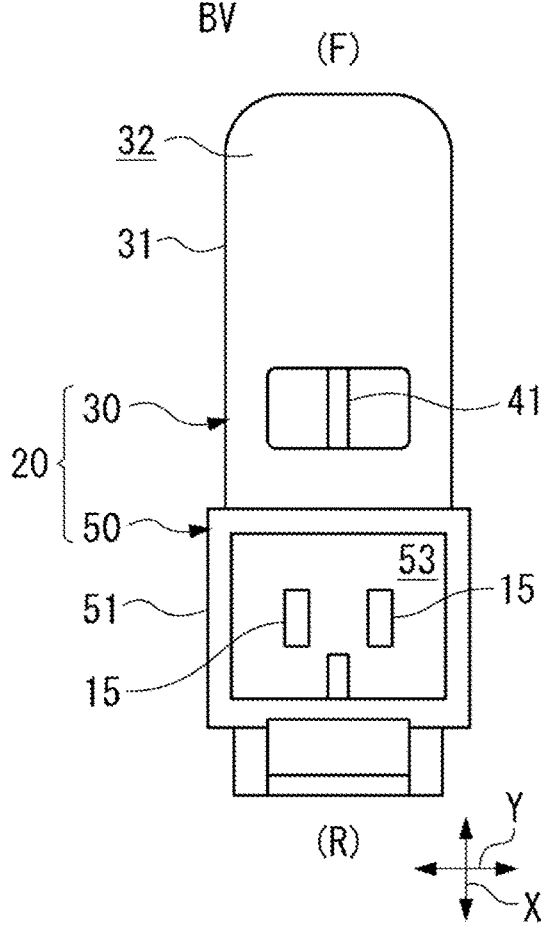

As shown in FIG. 3, in the heat-sensitive portion 30, the side on which the heat-sensitive surface 32 is provided is defined as a head side (HS), and the reverse is defined as a back side (OS). The heat-sensitive surface 32 is arranged on the head side (HS), and a facing surface 36 that opposes the support body 110 is provided on the back side (OS). Further, in the heat-sensitive portion 30, a forward (F) and a rearward (R) are defined as shown in FIG. 3 and FIG. 4. The forward (F) and the rearward (R) have a relative meaning. For example, as described later, a pressing body 37 is provided forward (F) with respect to a positioning piece 39, and the positioning piece 39 is provided rearward (R) with respect to the pressing body 37.

As shown in FIG. 2 and FIG. 3, a pair of pressing bodies 37, 37 and a pair of positioning pieces 39, 39 are provided in the interior of the accommodating space 33. The pressing bodies 37, 37 and the positioning pieces 39, 39 both stand toward the back side (OS) from the reference surface 34 that is the surface on the back side of the heat-sensitive surface 32 of the heat-sensitive wall 31. Further, the pressing bodies 37, 37 are respectively provided on both sides in the width direction Y, with a predetermined gap therebetween. Similarly, the positioning pieces 39, 39 are provided on both sides in the width direction Y, with a predetermined gap therebetween. The positioning pieces 39, 39 are set so as to be wider than the pressing bodies 37, 37 in the gap in the width direction Y.

The pressing bodies 37, 37 are provided for pressing the heat-sensitive body 11 against the reference surface 34 such that the heat-sensitive body 11 covered with the sealing layer 16 does not float up from the reference surface 34 of the heat-sensitive wall 31. Therefore, the pressing bodies 37, 37 have the following characteristic shape and arrangement. Hereinafter, the heat-sensitive body 11 covered with the sealing layer 16 is occasionally referred to as merely the heat-sensitive body 11, for simplifying the description.

Each of the pressing bodies 37, 37 includes a support piece 37A that stands from the reference surface 34 and a flange 37B that projects from an upper end portion of the support piece 37A toward the center in the width direction Y. As an example, the flanges 37B, 37B are provided over the whole length of the support piece 37A in the length direction X. The flanges 37B, 37B have a function to perform the positioning of the heat-sensitive body 11 toward the center in the width direction Y, in addition to a function to press the heat-sensitive body 11 against the reference surface 34.

The gap between the pressing bodies 37, 37 is continuously narrowed from the rearward (R) side toward the forward (F) side. Since the gap is narrowed, the arrangement of the pressing bodies 37, 37 in plan view has a tapered shape. Therefore, both the gap between the support pieces 37A, 37A and the gap between the flanges 37B, 37B are narrowed. Further, the dimension of each of the pressing bodies 37, 37 in the height direction Z is continuously decreased from the rearward (R) side toward the forward (F) side. Also as for this, for both the support pieces 37A, 37A and the flanges 37B, 37B, the dimension in the height direction Z is continuously decreased.

Before the heat-sensitive body 11 is pressed in between the pressing bodies 37, 37, the heat-sensitive body 11 is put between the positioning piece 39 and the positioning piece 39. Thereby, the positioning of the heat-sensitive body 11 in the width direction Y with respect to the pressing bodies 37, 37 is performed. The heat-sensitive body 11 for which the positioning is performed between the positioning piece 39 and the position piece 39 is moved forward (F), and thereby is pressed in between the pressing bodies 37, 37.

The positioning pieces 39, 39 that performs the above positioning function are provided on both sides of the accommodating space 33 in the width direction Y, with the predetermined gap therebetween. The center of this gap and the center of the predetermined gap between the pressing bodies 37, 37 coincide with each other. Accordingly, an axis line C (see FIG. 5) of the heat-sensitive body 11 that is put between the positioning pieces 39, 39 coincides with or nearly coincides with the center of the gap between the positioning pieces 39, 39, and when the heat-sensitive body 11 is moved forward (F), the axis line C of the heat-sensitive body 11 coincides with or nearly coincides with the center of the gap between the pressing bodies 37, 37, at this time. In this way, the heat-sensitive body 11 is arranged at a position suitable for the temperature detection, because of the presence of the pressing bodies 37, 37.

As shown in FIG. 3 and FIG. 4, a partition 41 that sections the lead terminals 15, 15 of the sensor element 10 into both sides in the width direction Y is provided rearward (R) of the positioning pieces 39, 39. The partition 41 includes a base 41A that stands from the reference surface 34 toward the back side (OS) and that extends in the length direction X, and a terminal pressing member 41C that projects from a top portion 41B of the base 41A in the width direction Y. The terminal pressing member 41C is partially provided on the rearward (R) side of the base 41A.

The lead terminals 15, 15 are arranged on both sides in the width direction Y with respect to the partition 41 at the center, and the lead terminals 15, 15 are sandwiched between the base 41A and the lateral walls 35C, 35C, so that the positioning of the lead terminals 15, 15 in the width direction Y is performed. Further, the lead terminals 15, 15 are sandwiched between the terminal pressing member 41C and the reference surface 34 of the heat-sensitive wall 31, so that the positioning in the height direction Z is performed. The lead terminals 15, 15 extend rearward (R), and stand in the height direction Z in the interior of the connection portion 50.

[Connection Portion 50: FIG. 2, FIG. 3, FIG. 4]

The connection portion 50 communicates with the heat-sensitive portion 30 on the rearward (R) side, and has a function as a connector that serves for the connection with a circuit component electrically connected with the temperature sensor 1, for example. Therefore, the connection portion 50 includes a receiving housing 51 in which the receiving cavity 53 that receives a mating connector is formed in the interior. The mating connector is inserted into the receiving cavity 53, and mating terminals are electrically connected with the lead terminals 15, 15 in the interior of the receiving cavity 53.

Figure 5:
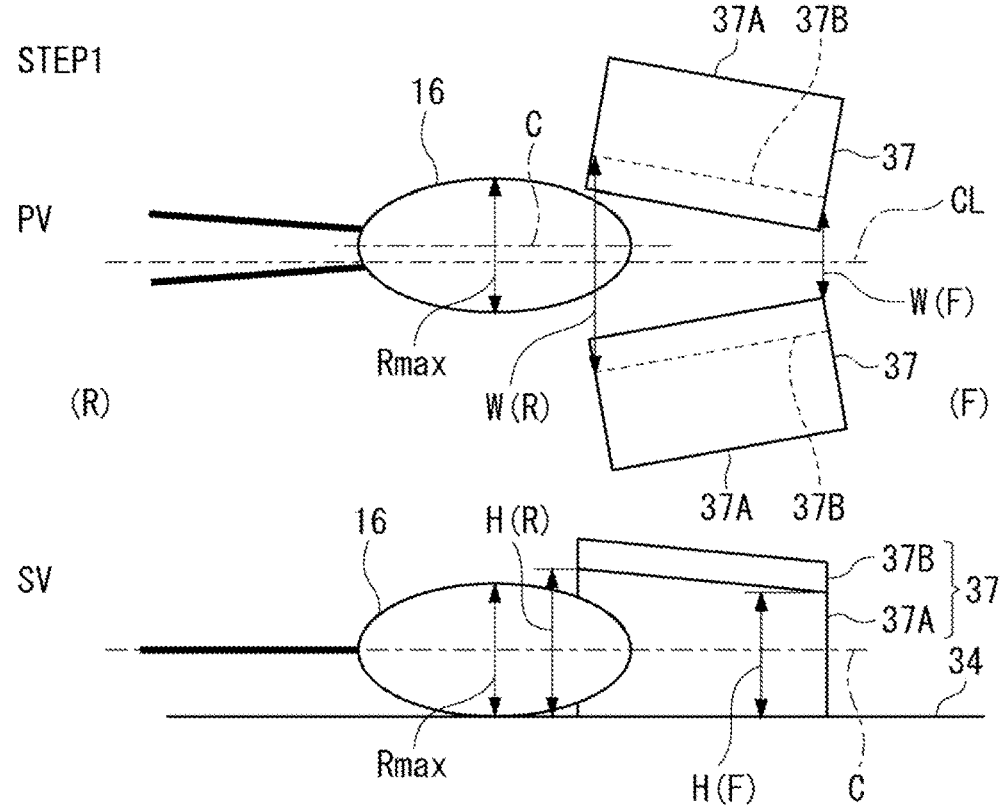
FIG. 5 is a diagram showing an attachment procedure for the sensor element in the temperature sensor in FIG. 1.
Figure 5:
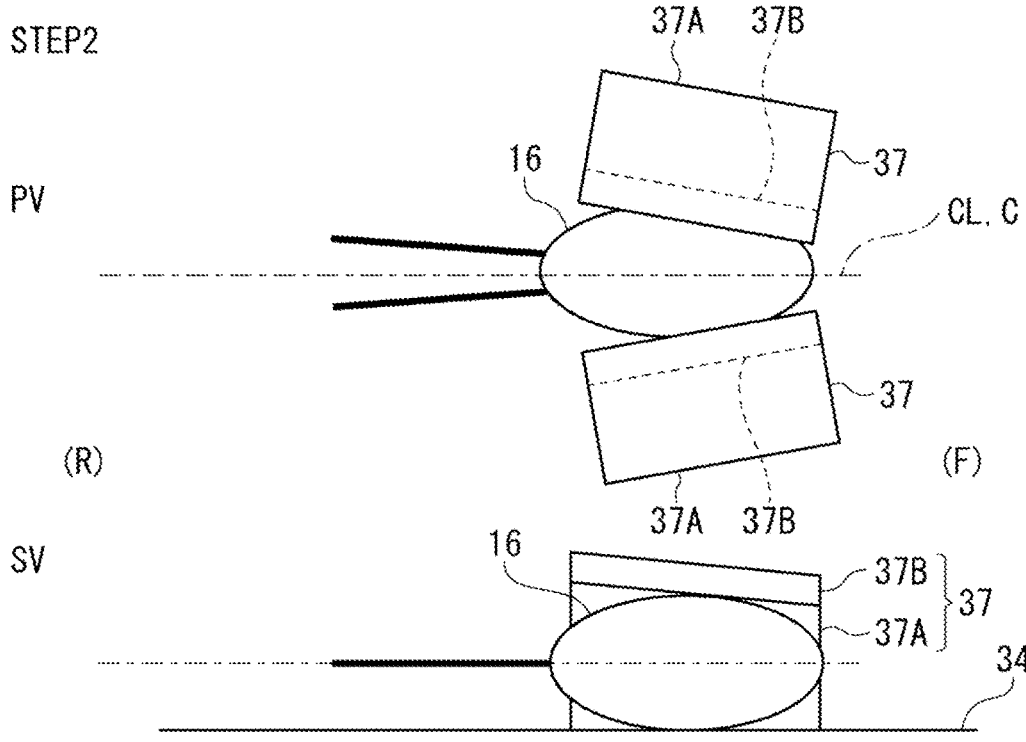

[Attachment of Sensor Element 10 to Heat-Sensitive Portion 30: FIG. 5]

Next, an attachment procedure for the sensor element 10 to the heat-sensitive portion 30, particularly, a procedure in which the heat-sensitive body 11 covered with the sealing layer 16 is pressed in between the pressing bodies 37, 37 will be described.

<Positioning: STEP 1>

Ideally, the positioning is performed such that a central line CL between the pressing bodies 37, 37 and the axis line C of the sealing layer 16 including the heat-sensitive body 11 coincide with respect to the width direction Y. However, as illustrated, the central line CL and the axis line C are allowed to deviate. As for the height direction z, the positioning is performed by the contact of the sealing layer 16 with the reference surface 34.

The gaps between the support pieces 37A, 37A of the pressing bodies 37, 37 on the rearward (R) side and forward (F) side are referred to as W (R) and W (F), respectively. Further, the distances from the reference surface 34 to the flanges 37B, 37B of the pressing bodies 37, 37 on the rearward (R) side and forward (F) side are referred to as H (R) and H (F), respectively. Further, the maximum diameter of the sealing layer 16 is referred to as Rmax. The pressing bodies 37, 37 are formed to have relations described below.

$$W(F) < R\max < W(R) \qquad \text{Relation (1)}$$

$$H(F) < R\max < H(R) \qquad \text{Relation (2)}$$

<Pressing: STEP 2>

When the positioning of the sealing layer 16 with respect to the pressing bodies 37, 37 is finished, the sealing layer 16 of the sensor element 10 is pressed in between the pressing bodies 37, 37 and the reference surface 34.

The gap between the pressing bodies 37, 37 in the width direction Y is narrowed forward (F), and moreover, the pressing bodies 37, 37 are arranged at line-symmetric positions with respect to the central line CL. Accordingly, the sealing layer 16 is pressed forward (F) while contacting with the support pieces 37A, 37A of the pressing bodies 37, 37. Because of the relation (1), the sealing layer 16 cannot pass forward (F) of the pressing bodies 37, 37, abuts against the support pieces 37A, 37A, and stops. At this time, the stress due to the pressing of the sealing layer 16 is generated in the support pieces 37A, 37A, and the sealing layer 16 is occasionally sandwiched between the support pieces 37A, 37A.

Further, the dimension of the flange 37B of the pressing body 37 from the reference surface 34 in the length direction X is decreased forward (F). Accordingly, the sealing layer 16 is pressed forward (F) while contacting with the reference surface 34 and the flange 37B. Because of the relation (2), the sealing layer 16 cannot pass through between the reference surface 34 and the flange 37B forward (F), abuts against the reference surface 34 and the flange 37B, and stops. At this time, the stress due to the pressing of the sealing layer 16 is generated in the flanges 37B, 37B, and the sealing layer 16 is occasionally sandwiched between the flange 37B and the reference surface 34.

[Resin Mold 45: FIG. 1]

The accommodating space 33 of the heat-sensitive portion 30 in which the sensor element 10 is accommodated is sealed by the resin mold 45. The resin mold 45 is composed of a resin material having an electrical insulating property, for example, an epoxy resin. Since the accommodating space 33 is sealed by the resin mold 45, the weather resistance of the sensor element 10 is ensured.

Figure 6:
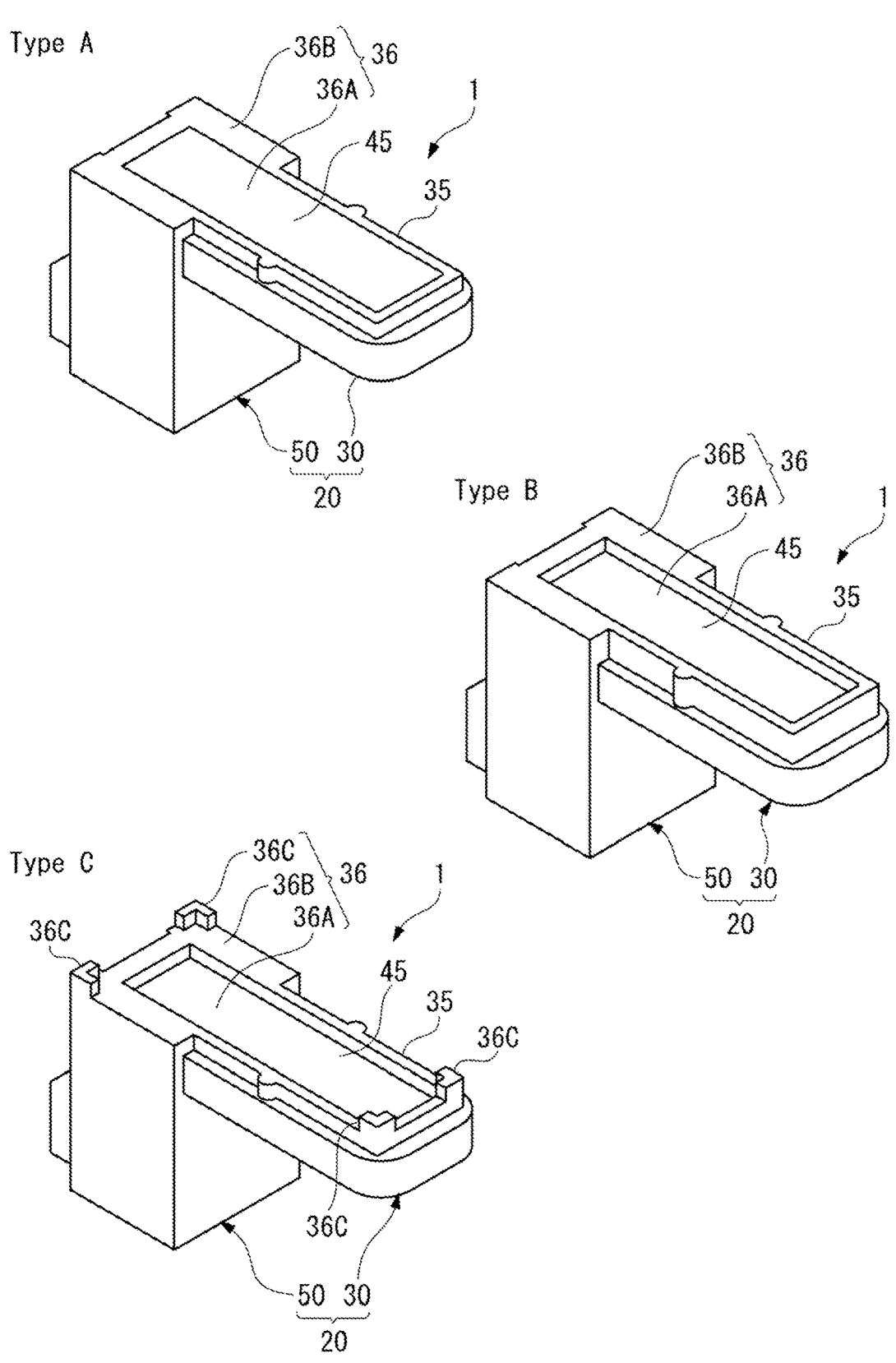
FIG. 6 is a perspective view showing three forms for a facing surface of a heat-sensitive portion of the temperature sensor in FIG. 1.

[Forms of Side of Facing Surface 36: FIG. 6, FIG. 7]

In the temperature sensor 1, the heat-sensitive surface 32 of the heat-sensitive portion 30 contacts with the measurement object 100, and the heat-sensitive portion 30 is placed on the support body 110, for maintaining the contact of the heat-sensitive surface 32 and the measurement object 100. At this time, heat is transferred from the facing surface 36 of the heat-sensitive portion 30 to the support body 110. Heat escape that is the heat transfer affects responsiveness in the temperature detection of the measurement object 100. That is, the restraint of the heat escape positively affects the responsiveness. Hence, the relation between the form of the side of the facing surface 36 and the responsiveness in the temperature detection was checked. The result will be described.

As the form of the side of the facing surface 36, three forms: Type A, Type B, and Type C described below were prepared. Heat-sensitive portions 30 in Type A, Type B, and Type C were the same in specifications such as shapes, dimensions, and constituent materials, except the following points.

Type A: A first facing surface 36A of the resin mold 45 is flush with a second facing surface 36B at the circumference.

Type B: The first facing surface 36A of the resin mold 45 is dented toward the heat-sensitive surface 32 relative to the second facing surface 36B at the circumference.

Type C: The first facing surface 36A of the resin mold 45 is dented toward the heat-sensitive surface 32 relative to the second facing surface 36B at the circumference, and there are support protrusions 36C at four corners of the second facing surface 36B.

The side of each facing surface 36 of Type A, Type B, and Type C is placed on the support body 110. In Type A, the whole of the facing surface 36 (36A, 36B) contacts directly with the support body 110. In Type B, the second facing surface 36B contacts directly with the support body 110, but there is an appropriate clearance between the first facing surface 36A and the support body 110. In Type C, the support protrusions 36C contact with the support body 110, but except this, there a clearance between the facing surface 36 and the support body 110.

The result of the evaluation of the heat responsiveness is as follows. The following evaluation result is shown as indexes when the heat responsiveness (time) of Type A is 1. Type A: 1.0, Type B: 0.85, Type C: 0.78

From the above evaluation result, it is found that there is an advantage in heat responsiveness when the area in which the side of the facing surface 36 contacts directly with the support body 110 is narrowed. When the heat conductivities of the resin material and air are compared, for example, the heat conductivity of the epoxy resin is about 10 times higher than that of air. That is, the resin material easily conducts heat, whereas air hardly conducts heat. That is, in Type A, since the whole of the facing surface 36 (36A, 36B) composed of the resin material contacts directly with the support body 110, the degree of the heat escape is large, and meanwhile, in Type B, since the cavity, namely, air is present between the second facing surface 36B and the support body 110, the degree of the heat escape is small. Furthermore, in Type C, the support protrusions 360 are provided on the second facing surface 36B, only the support protrusions 36C contact with the support body 110, and air is present between the other portion of the second facing surface 36B and the support body 110. Accordingly, Type C has a higher heat responsiveness than Type B.

As described above, for enhancing the heat responsiveness of the temperature sensor 1, it is preferable to reduce the area in which the facing surface 36 contacts directly with the support body 110, and specifically, it is preferable to dent the the first facing surface 36A of the resin mold 45 relative to second facing surface 36B. Furthermore, it is preferable to cause the second facing surface 36B to more partially contact with the support body 110, by providing the support protrusions 360 at the four corners, as an example.

Instead of denting the first facing surface 36A, the second facing surface 36B can be dented. However, in the embodiment, the first facing surface 36A is larger than the second facing surface 36B in surface area. Accordingly, when the first facing surface 36A is dented as in the case of Type B, the amount (volume) of the void space can be larger, and therefore the heat escape can be restrained. Further, in the case where the first facing surface 36A is composed of the resin mold 45, it is only necessary to control the amount of molten resin with which the accommodating space 33 is filled, for denting the first facing surface 36A relative to the second facing surface 36B. However, for denting the second facing surface 36B relative to the first facing surface 36A, it is necessary to provide, for example, a frame that holds molten resin until the molten resin is solidified to form the resin mold 45, and therefore, the work load is large.

[Effect of Temperature Sensor 1]

The temperature sensor 1 includes the pressing bodies 37, 37 in the heat-sensitive portion 30 of the holder 20.

Thereby, the heat-sensitive body 11 covered with the sealing layer 16 can be pressed against the reference surface 34 on the back side of the heat-sensitive surface 32. Accordingly, for example, even when the accommodating space 33 in which the sensor element 10 is accommodated is filled with the resin mold 45, it is possible to prevent the sealing layer 16 from being away and floating up from the reference surface 34.

Further, it is possible to accurately perform the positioning of the heat-sensitive body 11 in the length direction X and the width direction Y, and therefore it is possible to reduce the individual difference in the positional displacement in the heat-sensitive portion 30 of the heat-sensitive body 11. Therefore, according to the temperature sensor 1, it is possible to reduce the variation in detection temperature among many temperature sensors 1 that are industrially produced.

The temperature sensor 1 includes the positioning pieces 39, 39 in the heat-sensitive portion 30 of the holder 20.

By putting the sealing layer 16 between the positioning piece 39 and the positioning piece 39, it is possible to effortlessly press the sealing layer 16 in between the pressing body 37 and the pressing body 37.

The temperature sensor 1 includes the partition 41 that determines the respective positions of the lead terminals 15, 15 in the interior of the accommodating space 33. Further, the partition 41 includes the terminal pressing member 41C that sandwiches the lead terminals 15, 15 with the reference surface 34, and therefore it is possible to restrain the positional displacement of the lead terminals 15, 15 after the accommodating space 33 is filled with the resin mold 45.

The heat responsiveness of the temperature sensor 1 is enhanced by reducing the area of the contact between the facing surface 36 and the support body 110 in the temperature sensor 1.

The preferred embodiment of the temperature sensor 1 of the present invention has been described above, but the present invention is not limited to this.

For example, the pressing body 37 and the pressing body 37 are formed with the predetermined gap therebetween in the width direction Y, independently of each other, but the present invention is not limited to this. For example, the flange 37B and the flange 37B may be connected, and may have a roof-like shape. However, it is difficult to make this shape integrally with the other portion, by injection molding, and therefore, in the case where injection molding is used, the roof is attached and formed later.

Next, as means for reducing the area of the contact between the facing surface 36 and the support body 110, protrusions corresponding to the support protrusions 36C can be provided in the range of the first facing surface 36A, instead of providing the support protrusions 36C on the second facing surface 36B.

REFERENCE SIGNS LIST

1 Temperature sensor
10 Sensor element
11 Heat-sensitive body
12 Electrode
13 Lead wire
15 Lead terminal
16 Sealing layer
20 Holder
30 Heat-sensitive portion
31 Heat-sensitive wall
32 Heat-sensitive surface
33 Accommodating space
34 Reference surface
35 Accommodating frame
35A Forward wall
35B Rearward wall
35C Lateral wall
36 Facing surface
36A First facing surface
36B Second facing surface
36C Support protrusion
37 Pressing body
37A Support piece
37B Flange
39 Positioning piece
41 Partition
41A Base
41B Top portion
45 Resin mold
50 Connection portion
51 Receiving housing
53 Receiving cavity
100 Measurement object
110 Support body
C Axis line
CL Central line

The invention claimed is:

1. A temperature sensor comprising:
a sensor element including a heat-sensitive body, a pair of lead wires that is electrically connected with the heat-sensitive body, a sealing layer made of glass that covers the heat-sensitive body and a part of the pair of lead wires, and a pair of lead terminals that is electrically connected with the pair of lead wires; and
a holder that holds the sensor element, wherein the holder includes
a heat-sensitive surface configured to receive heat from a measurement object,
a reference surface provided on a back side of the heat-sensitive surface, and
a pressing body that is provided on the reference surface and presses the heat-sensitive body against the reference surface through the sealing layer, and
wherein the sensor element is accommodated inside the holder such that the sealing layer made of glass abuts against the reference surface.

2. The temperature sensor according to claim 1, wherein the holder includes a forward side on which the heat-sensitive body is arranged and a rearward side on which the pair of lead wires is drawn out,
the pressing body includes a pair of pressing pieces in a width direction in which the heat-sensitive body is sandwiched,
each of the pair of pressing pieces includes a flange that presses the heat-sensitive body against the reference surface, and
a dimension of the flange from the reference surface is decreased from the rearward side toward the forward side of the heat-sensitive body.

3. The temperature sensor according to claim 2, wherein a gap between the pair of pressing pieces is narrowed from the rearward side toward the forward side of the heat-sensitive body.

4. The temperature sensor according to claim 2, comprising a pair of positioning pieces provided on the rearward side relative to the pair of pressing pieces, with a predetermined gap therebetween.

5. The temperature sensor according to claim 1, wherein the holder includes an accommodating space that is provided so as to face the reference surface and accommodates the sensor element, and the sensor element is sealed by a resin mold with which the accommodating space is filled.

6. The temperature sensor according to claim 5, wherein the holder includes a facing surface that opposes a support body on which the holder is placed when a temperature of the measurement object is detected, the facing surface includes a first facing surface of the resin mold and a second facing surface of an accommodating frame that encloses a circumference of the resin mold, and the first facing surface is dented to a side of the heat-sensitive surface relative to the second facing surface.

7. The temperature sensor according to claim 5, wherein the holder includes a partition that serves for positioning of the pair of lead terminals in an interior of the accommodating space, and the partition includes a base that stands from the reference surface and extends in a length direction orthogonal to a width direction in which the heat-sensitive body is sandwiched, and a terminal pressing member that projects from a top portion of the base in the width direction.

8. A rotary electric machine comprising the temperature sensor according to claim 1.

9. The temperature sensor according to claim 3, comprising a pair of positioning pieces provided on the rearward side relative to the pair of pressing pieces, with a predetermined gap therebetween.

10. The temperature sensor according to claim 6, wherein the holder includes a partition that serves for positioning of the pair of lead terminals in an interior of the accommodating space, and the partition includes a base that stands from the reference surface and extends in a length direction orthogonal to a width direction in which the heat-sensitive body is sandwiched, and a terminal pressing member that projects from a top portion of the base in the width direction.

* * * * *